(12) United States Patent
Grinenval et al.

(10) Patent No.: US 9,908,410 B2
(45) Date of Patent: Mar. 6, 2018

(54) METHOD AND DEVICE FOR WARNING THE DRIVER OF A MOTOR VEHICLE IN THE EVENT OF LACK OF ATTENTION

(71) Applicants: Charlotte Grinenval, Ludwigsburg (DE); Wolfgang Schroeder, Markgroeningen (DE)

(72) Inventors: Charlotte Grinenval, Ludwigsburg (DE); Wolfgang Schroeder, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/356,472

(22) PCT Filed: Sep. 18, 2012

(86) PCT No.: PCT/EP2012/068321
§ 371 (c)(1),
(2) Date: May 6, 2014

(87) PCT Pub. No.: WO2013/068164
PCT Pub. Date: May 16, 2013

(65) Prior Publication Data
US 2015/0102929 A1    Apr. 16, 2015

(30) Foreign Application Priority Data

Nov. 7, 2011 (DE) .................... 10 2011 085 825

(51) Int. Cl.
*G05B 19/00*     (2006.01)
*B60K 28/06*     (2006.01)
(Continued)

(52) U.S. Cl.
CPC ............ *B60K 28/06* (2013.01); *B60K 28/066* (2013.01); *G08B 21/0415* (2013.01);
(Continued)

(58) Field of Classification Search
CPC ...... B60K 28/06; B60K 28/066; G08B 21/06; B60W 2550/10; B60W 2550/12; B60W 2540/26
(Continued)

(56) References Cited

U.S. PATENT DOCUMENTS 5,570,698 A * 11/1996 Liang et al. .................. 600/558
5,642,093 A     6/1997 Kinoshita et al.
(Continued)

FOREIGN PATENT DOCUMENTS

CN    101327795        12/2008
CN    101450656 A       6/2009
(Continued)

OTHER PUBLICATIONS

International Search Report for PCT/EP2013/068321, dated Dec. 20, 2012.

*Primary Examiner* — Omeed Alizada
(74) *Attorney, Agent, or Firm* — Norton Rose Fulbright US LLP; Gerard Messina

(57) ABSTRACT

In a method for warning the driver of a motor vehicle in the event of lack of attention, in order to improve the acceptance of such systems among drivers, it is provided to monitor the driver with regard to lack of attention and also to ascertain the instantaneous driving situation of the vehicle, and, if lack of attention of the driver has been determined, to output a warning signal only in certain driving situations, but not in others.

7 Claims, 1 Drawing Sheet

(51) Int. Cl.
*G08B 21/06* (2006.01)
*G08B 21/04* (2006.01)

(52) U.S. Cl.
CPC ......... *G08B 21/06* (2013.01); *B60W 2540/26* (2013.01); *B60W 2550/10* (2013.01); *B60W 2550/12* (2013.01)

(58) Field of Classification Search
USPC ........................................................ 340/438
See application file for complete search history.

(56) References Cited

U.S. PATENT DOCUMENTS

| | | | | |
|---|---|---|---|---|
| 6,130,617 | A * | 10/2000 | Yeo ................................ | 340/575 |
| 6,950,027 | B2 * | 9/2005 | Banas ............................ | 340/576 |
| 6,974,414 | B2 * | 12/2005 | Victor ........................... | 600/300 |
| 7,424,357 | B2 * | 9/2008 | Ozaki et al. .................... | 701/70 |
| 7,620,521 | B2 * | 11/2009 | Breed et al. .................. | 702/173 |
| 8,698,639 | B2 * | 4/2014 | Fung et al. ..................... | 340/576 |
| 2003/0153846 | A1 * | 8/2003 | Marple-Horvat ............... | 600/587 |
| 2005/0246134 | A1 * | 11/2005 | Nagai et al. ................... | 702/182 |
| 2006/0049246 | A1 * | 3/2006 | Lee ....................... G07C 5/0858 | 235/384 |
| 2008/0228046 | A1 * | 9/2008 | Futatsuyama et al. ........ | 600/301 |
| 2009/0091435 | A1 * | 4/2009 | Bolourchi ..................... | 340/435 |
| 2010/0004839 | A1 * | 1/2010 | Yokoyama ............. G08G 1/052 | 701/70 |
| 2010/0106365 | A1 * | 4/2010 | Visconti et al. ................. | 701/36 |
| 2010/0295707 | A1 * | 11/2010 | Bennie et al. ................. | 340/988 |
| 2011/0213511 | A1 * | 9/2011 | Visconti et al. ................... | 701/1 |
| 2012/0271484 | A1 * | 10/2012 | Feit ....................... B60W 50/14 | 701/1 |
| 2013/0257620 | A1 * | 10/2013 | Tsou ....................... A61B 5/18 | 340/573.1 |
| 2014/0025285 | A1 * | 1/2014 | Trombley ............. G01S 5/0072 | 701/301 |

FOREIGN PATENT DOCUMENTS

| | | |
|---|---|---|
| CN | 101565036 | 10/2009 |
| CN | 101860702 | 10/2010 |
| CN | 201633551 U | 11/2010 |
| CN | 101983881 | 3/2011 |
| CN | 201773475 | 3/2011 |
| DE | 10 2010 007241 | 9/2010 |
| JP | H07257301 A | 10/1995 |
| JP | H11328593 A | 11/1999 |
| JP | 2001138767 A | 5/2001 |
| JP | 2004171060 | 6/2004 |
| JP | 2007051973 | 3/2007 |
| JP | 2007226666 A | 9/2007 |
| JP | 2007257301 A | 10/2007 |
| JP | 2008065380 | 3/2008 |
| JP | 2009032190 A | 2/2009 |
| JP | 2009122013 | 6/2009 |
| JP | 2009244959 A | 10/2009 |
| JP | 2009244986 | 10/2009 |
| JP | 2011008457 A | 1/2011 |

* cited by examiner

METHOD AND DEVICE FOR WARNING THE DRIVER OF A MOTOR VEHICLE IN THE EVENT OF LACK OF ATTENTION

BACKGROUND OF THE INVENTION

1. Field of the Invention

The present invention relates to a method and a device for warning the driver of a vehicle in the event of lack of attention.

2. Description of the Related Art

Various systems for monitoring and warning the driver of a motor vehicle in the event of lack of attention are known from the related art. Some of these systems employ an in-car camera which monitors the eyes of the driver or his/her head position and is capable of recognizing whether a microsleep occurred or the driver has moved his/her head to one side and therefore cannot sufficiently observe the traffic. Other systems employ, in turn, different sensors, e.g., a steering wheel sensor or a brake and/or accelerator pedal sensor whose sensor signals are evaluated with regard to certain patterns which indicate that the driver is inattentive. If such a behavioral pattern occurs and the system accordingly recognizes that the driver is inattentive, a warning signal, e.g. a visual or an acoustic signal, is generated which is to warn the driver and prompt him/her to focus more on steering the vehicle.

The systems for monitoring the driver's attention known from the related art generate warning signals relatively frequently and thereby easily reach the driver's acceptance limit. If the system warns the driver too frequently—even if the driver was in fact inattentive—the driver will either get used to the warning and ignore it more or less, or the driver will turn the warning function off completely if it annoys him/her.

In any case, the actual main purpose of the warning function, i.e., warning the driver in the event of inattention, can no longer be fulfilled.

BRIEF SUMMARY OF THE INVENTION

It is therefore the object of the present invention to provide a method or a device for warning the driver of a motor vehicle in the event of lack of attention which is perceived by the driver to be less annoying, but which still warns the driver sufficiently reliably in the event of lack of attention.

According to the present invention, a method for warning the driver of a motor vehicle in the event of lack of attention is provided in which the attention of the driver is monitored and the driving situation of the vehicle is ascertained, and a warning signal is generated as a function of the instantaneous driving situation of the vehicle. The warning system according to the present invention may, for example, be configured in such a way that a warning signal is generated in certain driving situations, but not in others. It may, however, also be configured in such a way that the warning signal is output in different intensities as a function of the driving situation. In this way, fewer or fewer strong warning signals are generated, so that the driver is disturbed a lot less and thus is more inclined to accept the warning system.

Those driving situations in which a warning signal or a warning signal with high intensity is generated in the event of lack of attention of the driver are preferably those bearing an increased risk potential. These driving situations may, for example, be freely defined by predefining threshold values or certain conditions.

According to one preferred specific embodiment of the present invention, at least one driving situation is defined in which a warning signal is to be output in the event of lack of attention of the driver and/or at least one driving situation is defined in which a warning signal is not to be output in the event of lack of attention of the driver. During the driving operation, it is preferably checked whether the vehicle is in a driving situation of the first or second category mentioned above.

A driving situation of the first category, i.e., in which a warning signal is to be generated in the event of lack of attention of the driver, may, for example, be defined by one or multiple of the following conditions: The vehicle speed is greater than a predefined threshold value; the vehicle is crossing an intersection or is approaching an intersection; the vehicle is being driven on a critical route having an increased potential for accidents, e.g., a mountain road, a road having tight turns or deer crossings, in a school zone or a crosswalk; the vehicle is located in the proximity of a tail end of a traffic jam or a construction site; the weather conditions are unfavorable, e.g., there is rain, fog, or low temperatures approximately 0° C. or below; the vehicle is pulling a trailer; and/or the vehicle is being driven in the dark or there is low visibility. By predefining different threshold values, e.g., multiple speed threshold values, it is possible to define different driving situations in which warning signals are to be generated in different intensities.

The conditions for outputting warning signals may be established individually depending on the specific embodiment of the warning system.

Similarly, driving situations in which a warning signal is not to be output in the event of lack of attention of the driver may also be defined using one or multiple conditions, for example: the vehicle speed is below a predefined threshold value; the vehicle is not crossing and is not approaching an intersection; the vehicle is being driven on a route having little risk potential, e.g., a straight, clear route; deer crossings are unlikely; the vehicle is not located in the proximity of a tail end of a traffic jam or a construction site; the weather conditions are good, in particular, there is no rain or fog and the temperatures are higher than the freezing point or another temperature threshold value; the vehicle does not pull a trailer and/or the vehicle is being driven during daylight hours.

The conditions for driving situations of the second category in which a warning signal is not to be output may also be established individually as desired.

The driver's attention may in principle be monitored with the aid of all common sensors and methods. For example, the driver may be video-taped with the aid of an in-car camera, and the image data may be used to ascertain whether or not the driver is attentive. With the aid of the camera, it is, for example, possible to recognize whether the eyes of the driver are closed or open, or whether the driver has tilted his/her head to one side.

Alternatively, whether or not the driver is attentive may also be recognized from the sensor data of a steering wheel sensor which detects the steering behavior of the driver and/or from a brake sensor which detects the actuation of the foot brake and/or from a sensor which detects directly or indirectly the actuation of the accelerator pedal. The sensor signals of one or multiple sensors may, for example, be checked for certain patterns in order to be able to infer therefrom whether the driver is attentive or inattentive.

The warning signal output by the warning system according to the present invention may be, for example, a visual or an acoustic signal. Alternatively, a signal which is haptically detectable by the driver, e.g. a vibration on the steering wheel, may also be generated.

A corresponding system according to the present invention for warning a driver in the event of lack of attention includes at least one sensor system for recognizing lack of attention of the driver, means for recognizing the driving situation of the vehicle, as well as a unit which evaluates the sensor signals of the sensor system and of the means and which outputs a warning signal in the event of lack of attention of the driver, taking into consideration the driving situation. Depending on the driving situation, a warning signal may, for example, be generated in different intensities or by a different source. It is also possible that a warning signal is not generated.

To carry out the method, a software algorithm is preferably provided which is stored in a control unit, in particular. The algorithm processes information about the attention of the driver and also about the driving situation and then decides, as a function of these two factors, whether or not a warning signal is output. It may also be provided that a warning signal is output in different intensities as a function of the driving situation.

The present invention is elucidated below in greater detail, as an example, on the basis of the appended drawings.

DETAILED DESCRIPTION OF THE INVENTION

Figure 1:
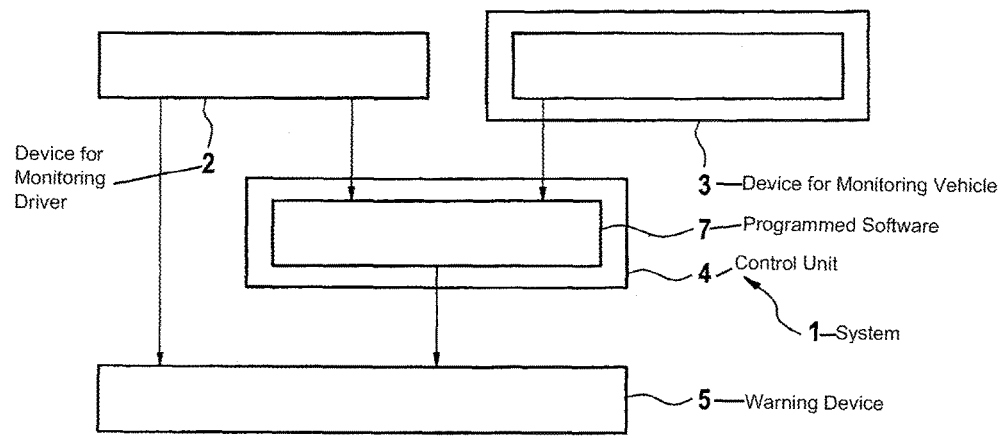
FIG. 1 shows a schematic block diagram of a system for warning the driver of a motor vehicle in the event of lack of attention.

FIG. 1 shows a schematic diagram of a system 1 for warning the driver of a motor vehicle in the event of lack of attention. System 1 includes a device 2 for monitoring the driver, the device being capable of recognizing inattentive behavior of the driver, and means 3 for recognizing the driving state of the vehicle.

Device 2 for monitoring the driver may, for example, include an in-car camera which continuously video-tapes the driver. It is, for example, possible to ascertain with the aid of an image processing software whether the driver's eyes are open or closed, or, for example, whether he/she has tilted the head to one side. Alternatively or additionally, the driving behavior of the driver, such as the steering behavior, braking behavior, or acceleration behavior, may be monitored with the aid of appropriate sensors. Certain behavioral patterns may then be used to recognize whether or not the driver is attentive.

For monitoring the driving situation of the vehicle, one or multiple sensors may also be provided, e.g., surroundings sensors including radar sensors or an outside camera, wheel rotational speed sensors, a rain and/or temperature sensor, as well as other common sensors. Information about the instantaneous driving situation may also be received and evaluated by the vehicle via long-distance data transmission. Such data are, for example, GPS data, radio traffic information or weather information which are generated externally and transmitted to the vehicle via long-distance data transmission.

System 1, illustrated in FIG. 1, for warning the driver of the motor vehicle also includes a control unit 4 having a software algorithm which processes the data of device 2 for monitoring the driver and also the data of device 3 for recognizing the situation. Software algorithm 7 is, for example, programmed in such a way that in the event of recognized inattention of the driver, a warning signal is output to the driver only in certain driving situations, but not in other driving situations. Algorithm 7 checks during the driving operation whether the instantaneous driving situation has certain predefined properties and accordingly recognizes the driving situation as "critical" or "noncritical." It may, for example, be checked within the scope of the situation recognition whether the vehicle speed is greater than a predefined threshold value, the vehicle is approaching an intersection or driving on a route having increased risk potential, or whether other conditions are present which require the driver to be particularly alert. According to one specific embodiment of the present invention, conditions may, for example, be predefined as "critical" and/or "noncritical" driving situations in which a warning signal is output or not output, respectively. Different conditions may, however, also be defined in which warning signals are output in different intensities.

A warning message may, for example, be a visual or an acoustic signal. Block 5 represents here a corresponding device, e.g., a signal lamp in the dashboard of the vehicle or a loudspeaker with the aid of which the warning signal is output.

Figure 2:
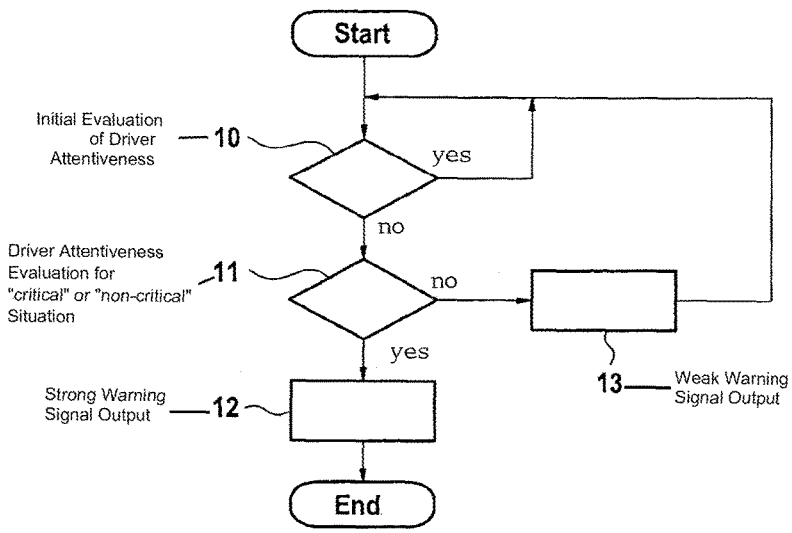
FIG. 2 shows different method steps of a method for warning the driver of a motor vehicle in the event of lack of attention.

FIG. 2 shows a flow chart to illustrate a few method steps of a method for warning a driver in the event of lack of attention. Here, it is initially checked in a step 10 whether the driver is attentive or inattentive. If the driver is paying sufficient attention (case Y), the method branches back to the start and the driver is continuously monitored. If, however, a lack of attention has been determined (case N), it is checked in step 11 whether the instantaneous driving situation fulfills one or multiple predefined condition(s) and is thus considered to be "critical" or "noncritical." In the case of a critical driving situation (Y), a warning signal is output to the driver in step 12. Otherwise (case N), no warning signal or an attenuated warning signal is output in step 13 and the method subsequently branches back to step 10.

What is claimed is:

1. A method for warning a driver of a host motor vehicle in the event of a lack of attention by the driver, comprising:
   monitoring the driver's attention level to ascertain a lack of attention by the driver;
   ascertaining a driving situation of the vehicle;
   detecting whether the driving situation of the vehicle includes at least one predefined condition requiring the driver to be alert;
   designating the driving situation of the vehicle as critical if the at least one predefined condition is detected and designating the driving situation of the vehicle as noncritical if the at least one predefined condition is not detected;
   generating, in the event the lack of attention by the driver has been ascertained, a warning signal only if the driving situation of the vehicle is designated as critical;
   in response to the determination that the driver is lacking attention and to the designating of the driving situation as non-critical, suppressing the generating of the warning signal.

2. The method as recited in claim 1, wherein the intensity of the generated warning signal is varied as a function of a risk potential of the driving situation of the vehicle.

3. The method as recited in claim 1, wherein a critical driving situation is defined by at least one of the following conditions:
   the speed of the host vehicle is greater than a predefined threshold value;
   the host vehicle is one of crossing an intersection or approaching the intersection;
   the host vehicle is being driven on a route including one of a mountain road, twisting turns, deer crossings, a school zone or a crosswalk;
   the host vehicle is in the proximity of a rear end of one of a traffic jam or a construction site;
   weather conditions including one of rain, fog, snow or freezing temperatures;
   the host vehicle is pulling a trailer; and
   the host vehicle is being driven in the dark.

4. The method as recited in claim 1, wherein a noncritical driving situation is defined by at least one of the following conditions:
   the speed of the host vehicle is less than a predefined threshold value;
   the host vehicle is not crossing an intersection and not approaching the intersection;
   the host vehicle is not being driven on a route including one of a mountain road, twisting turns, deer crossings, a school zone or a crosswalk;
   the host vehicle is not in the proximity of a rear end of one of a traffic jam or a construction site;
   weather conditions do not include any one of rain, fog, snow or freezing temperatures;
   the host vehicle is not pulling a trailer; and
   the host vehicle is being driven in during daylight hours.

5. The method as recited in claim 1, wherein a driving behavior of the driver is monitored using at least one sensor, and a lack of attention by the driver is ascertained from sensor data output by the at least one sensor.

6. The method as recited in claim 5, wherein the driving behavior of the driver is monitored using output signals generated by at least one of an in-car camera, a steering wheel sensor, a brake pedal sensor, or an accelerator pedal sensor.

7. A device for warning a driver of a host motor vehicle in the event of a lack of attention by the driver, comprising:
   a first sensor for monitoring signals relating to the driver's attention level to ascertain a lack of attention by the driver;
   a second sensor for ascertaining a driving situation of the vehicle; and
   a control unit configured to (i) evaluate output signals of the first sensor and the second sensor for ascertaining the driving situation of the vehicle, (ii) detect whether the driving situation of the vehicle includes at least one predefined condition requiring the driver to be alert, (iii) designate the driving situation of the vehicle as critical if the at least one predefined condition is detected and designate the driving situation of the vehicle as noncritical if the at least one predefined condition is not detected, and (iv) generate, in the event the lack of attention by the driver has been ascertained, a warning only if the driving situation of the vehicle is designated as critical, wherein in response to the determination that the driver is lacking attention and to the designating of the driving situation as non-critical, suppressing the generating of the warning.

\* \* \* \* \*